United States Patent
Kurahashi et al.

(10) Patent No.: US 6,801,287 B2
(45) Date of Patent: Oct. 5, 2004

(54) LIQUID CRYSTAL DISPLAY DEVICE HAVING TAPERED ELECTRODES

(75) Inventors: Nagatoshi Kurahashi, Mobara (JP); Yoshiaki Nakayoshi, Ooamishirasato (JP); Kazuhiko Yanagawa, Mobara (JP)

(73) Assignee: Hitachi, LTD, Tokyo (JP)

( * ) Notice: Subject to any disclaimer, the term of this patent is extended or adjusted under 35 U.S.C. 154(b) by 60 days.

(21) Appl. No.: 10/244,752

(22) Filed: Sep. 17, 2002

(65) Prior Publication Data

US 2003/0071950 A1 Apr. 17, 2003

(30) Foreign Application Priority Data

Oct. 17, 2001 (JP) ........................................ 2001-318830

(51) Int. Cl.$^7$ .......................................... G02F 1/1343
(52) U.S. Cl. ...................................................... 349/141
(58) Field of Search ................................ 349/141, 123

(56) References Cited

U.S. PATENT DOCUMENTS

| 5,680,187 | A | * | 10/1997 | Nagayama et al. | .......... 349/110 |
| 5,745,207 | A | * | 4/1998 | Asada et al. | ................. 349/141 |
| 6,069,678 | A | * | 5/2000 | Sakamoto et al. | .......... 349/141 |
| 6,665,036 | B2 | * | 12/2003 | Oh et al. | ..................... 349/141 |

* cited by examiner

*Primary Examiner*—Tarifur R. Chowdhury
*Assistant Examiner*—Jeanne Andrea Di Grazio
(74) *Attorney, Agent, or Firm*—Reed Smith LLP; Stanley P. Fisher, Esq.; Juan Carlos A. Marquez, Esq.

(57) ABSTRACT

A liquid crystal display device with a pair of substrates with a liquid crystal layer therebetween, a pair of electrodes disposed adjacent to each other in each pixel region of a liquid crystal side surface of one of the pair of substrates, at least one of the pair of electrodes being formed on a protective film comprised of an organic film and is in contact with an orientation film, wherein a film thickness of the orientation film overlying the protective film is greater than a film thickness of the orientation film overlying an electrodes being formed on the protective film.

10 Claims, 11 Drawing Sheets

(Mode 1)

Portion where orientation film was disappeared (Mode 2)

Portion where orientation film came unstuck (Model 3)

LIQUID CRYSTAL DISPLAY DEVICE HAVING TAPERED ELECTRODES

BACKGROUND OF THE INVENTION

1. Field of the Invention

The present invention relates to liquid crystal display device and also relates, for example, to a liquid crystal display device of the type employing the so-called lateral electric field scheme.

2. Description of Related Art

The liquid crystal display device of this type is such that a pixel electrode and an opposite or "counter" electrode which are disposed adjacent to each other are formed in a pixel region of a liquid crystal side surface of one substrate of respective substrates being disposed to oppose each other with a layer of liquid crystal material interposed therebetween, wherein components of an electric field created between these respective electrodes which are in parallel to the substrate are used to cause molecules of the liquid crystal material to take behavioral actions.

And, the one that applies this lateral electric field scheme to an active matrix type display device is arranged to use as pixel regions respective regions which are surrounded by a great number of parallel-provided gate signal lines extending on the liquid crystal side surface of one substrate in an "x" direction thereof and a great number of parallel-provided drain signal lines extending on the substrate surface in a "y" direction thereof and comprise in each of these pixel regions a thin-film transistor which is made active in response to receipt of a scan signal from a gate signal line and the aforesaid pixel electrode to which an image or video signal is supplied from a drain signal line through this thin-film transistor and also the counter electrode to which a signal is supplied which becomes a reference with respect to the image signal.

In addition, in view of the fact that the electric field for permitting liquid crystals to take behavioral actions is inherently weak and faint, the pixel electrode and the counter electrode are formed into band-like shapes respectively, at least one of which consists of a plurality of ones that becomes a comb-tooth like pattern while letting them be disposed alternately.

And, one is known in which the pixel electrode and the counter electrode are formed of different layers with a protective film sandwiched therebetween, wherein the protective film is comprised for example of an organic material layer which covers the thin-film transistor.

Due to this, an orientation film which determines the initial alignment of liquid crystal molecules is to be formed to cover the organic material layer for use as the protective film and one electrode of the above-noted pixel electrode and counter electrode.

SUMMARY OF THE INVENTION

However, it has been found that in the liquid crystal display device thus arranged in the way stated above, each of the following phenomena occurs due to unusual matter of the orientation film which is formed in direct contact with the liquid crystals.

More specifically, in cases where vibration shocks—in particular, vibrations at high-frequency waves—are applied to the liquid crystal display device, unwanted separation or peel-off takes place at the orientation film, causing bright points to generate on the entire surface of a display plane. The result of disassembling for investigation such liquid crystal display device has revealed that peel-off occurs at a portion of the orientation film overlying an electrode in a manner as shown in FIG. 9 (this phenomenon will be referred to as "Mode 1" hereinafter).

The bright points can also generate when the liquid crystal display device is continuously driven in a vibration-free state. As a result of disassembling for investigation this liquid crystal display device, it has been found that peel-off generates at part of the orientation film overlying the protective film as shown in FIG. 10 (this phenomenon will be referred to hereinafter as "Mode 2").

In addition, the bright points can gradually generate even in the so-called temperature cycling test which recurrently changes an ambient temperature of the liquid crystal display device between low and high temperatures. As a result of disassembling for investigation such liquid crystal display device, it has been found that the orientation film overlying an electrode is liberated with respect to this electrode as shown in FIG. 11A (this phenomenon will be referred to hereinafter as "Mode 3"). Note that FIG. 11B is a cross-sectional diagram as taken along line b—b of FIG. 11A.

Additionally each view of FIGS. 9, 10 and 11A is a drawing which corresponds to FIG. 3 which will be later presented.

The present invention has been made in light of the above-discussed technical background, and one of the advantages of this invention is to provide a liquid crystal display device which comprises an orientation film(s) with increased reliability.

A brief explanation will be given of the summary of representative ones of the inventive concepts as disclosed herein.

(1) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a insulating film and an orientation film is formed at an upper surface of the insulating film in such a way as to cover one of the pair of electrodes, a silane coupling material be mixed into the orientation film at a specific mixture ratio which is equal to or more than 0.1% and yet less than or equal to 2% with respect to an orientation film solid content concentration.

(2) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a insulating film and an orientation film is formed at an upper surface of the insulating film in such a way as to cover one of the pair of electrodes, wherein the orientation film is formed with its temperature suppressed to less than or equal to 250° C. during firing or baking in the fabrication thereof.

(3) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a insulating film and an orientation film is formed at an upper surface of the insulating film in such a way as to cover one of the pair of electrodes, that the above-noted one electrode exhibits a zigzag-shaped pattern having a plurality of bent portions along the extending direction thereof, and that the other electrode is disposed in parallel to the above-mentioned electrode.

(4) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a insulating film and an orientation film is formed at an upper surface of the insulating film in such a way as to cover one of the pair of electrodes, and that the orientation film is designed so that its film thickness falls within a range of from 60 to 250 nanometers (nm).

(5) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a insulating film and an orientation film is formed at an upper surface of the insulating film in such a way as to cover one of the pair of electrodes, that an orientation film is formed at an upper surface of the dielectric film in such a way as to cover one electrode of the pair of electrodes also, and that the orientation film is less than or equal to 95% in imidization ratio.

(6) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film and an orientation film is formed at an upper surface of the protective film in such a way as to cover one of the pair of electrodes, that the protective film is comprised of either an organic material layer or a sequential multilayer structure consisting of more than one inorganic material layer and more than one organic material layer, and that the film thickness of the orientation film over the protective film is designed to be greater than the film thickness of the orientation film over the above-stated one electrode.

(7) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film and an orientation film is formed at an upper surface of the protective film in such a way as to cover one of the pair of electrodes, and that the orientation film is arranged so that its film thickness is different in each region as subdivided into a plurality of ones.

(8) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film and an orientation film is formed at an upper surface of the protective film in such a way as to cover one of the pair of electrodes, and that a side-wall surface of the aforesaid one electrode is such that a taper is formed to have a trapezoidal shape when looking at from a bottom surface to upper surface of the one electrode.

(9) A liquid crystal display device in accordance with the present invention is, for example, in that a pair of neighboring electrodes are disposed with a protective film comprised of either an organic material layer or a sequential multilayer structure consisting of an inorganic material layer and an organic material layer interposed between them in each pixel region on the liquid crystal side surface of one substrate, an orientation film is formed at an upper surface of the organic material film in such a way as to cover one electrode of the pair of electrodes, the pair of electrodes are each arranged as an electrode group consisting of a plurality of electrodes, and that respective subdivided regions occupied by the one electrode are four regions or more whereas respective divided regions occupied by exposed part of the organic material layer are three regions or more.

(10) A liquid crystal display device in accordance with the present invention is, for example, the one that is arranged based on the arrangement of any one of the (1) to (9), wherein each pixel region is arranged to be surrounded by a pair of gate signal lines and a pair of drain signal lines and comprises within its region a thin-film transistor as rendered active by a scan signal coming from a gate signal line and a pixel electrode to which an image or video signal is supplied from a drain signal line through this thin-film transistor and also a counter electrode to which a signal for use as a reference with respect to the image signal is supplied, characterized in that the pixel electrode and the counter electrode are used to constitute the above-noted pair of electrodes.

(11) A liquid crystal display device in accordance with the present invention is the one that is arranged based on the arrangement of the (10) by way of example, characterized in that a counter electrode consisting essentially of a plurality of electrode groups is formed above the upper surface of the protective film which is comprised of either an organic material layer being formed to cover the thin-film transistor also or a multilayer structure of inorganic and organic material layers, and characterized by having a counter electrode of these respective counter electrodes whose center axis is made identical to and superposed with the center axis of a drain signal line and which is formed to have a width greater than a width of the drain signal line.

(12) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film comprised of an organic film and is in contact with an orientation film, wherein a film thickness of the orientation film overlying the protective film is greater than a film thickness of the orientation film overlying an electrodes being formed on the protective film.

(13) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film comprised of an organic film and is in contact with an orientation film, wherein said pair of electrodes have a plurality of electrodes respectively, and having plurality of regions formed between the electrodes with difference in film thickness of the orientation film.

(14) A liquid crystal display device in accordance with the present invention is, for example, a pair of substrates with a liquid crystal layer therebetween, a pair of electrodes disposed adjacent to each other in each pixel region of a liquid crystal side surface of one of the pair of substrates, at least one of the pair of electrodes being formed on a protective film comprised of an organic film and is in contact with an orientation film, wherein at least one of said pair of electrodes has a taper shape with a width on said protective film side being narrower than a width on said liquid crystal side.

DESCRIPTION OF THE PREFERRED EMBODIMENTS

Several preferred embodiments of the liquid crystal display device in accordance with the present invention will be explained by use of the accompanying drawings below.
Embodiment 1
<<Equivalent Circuit>>

Figure 2:
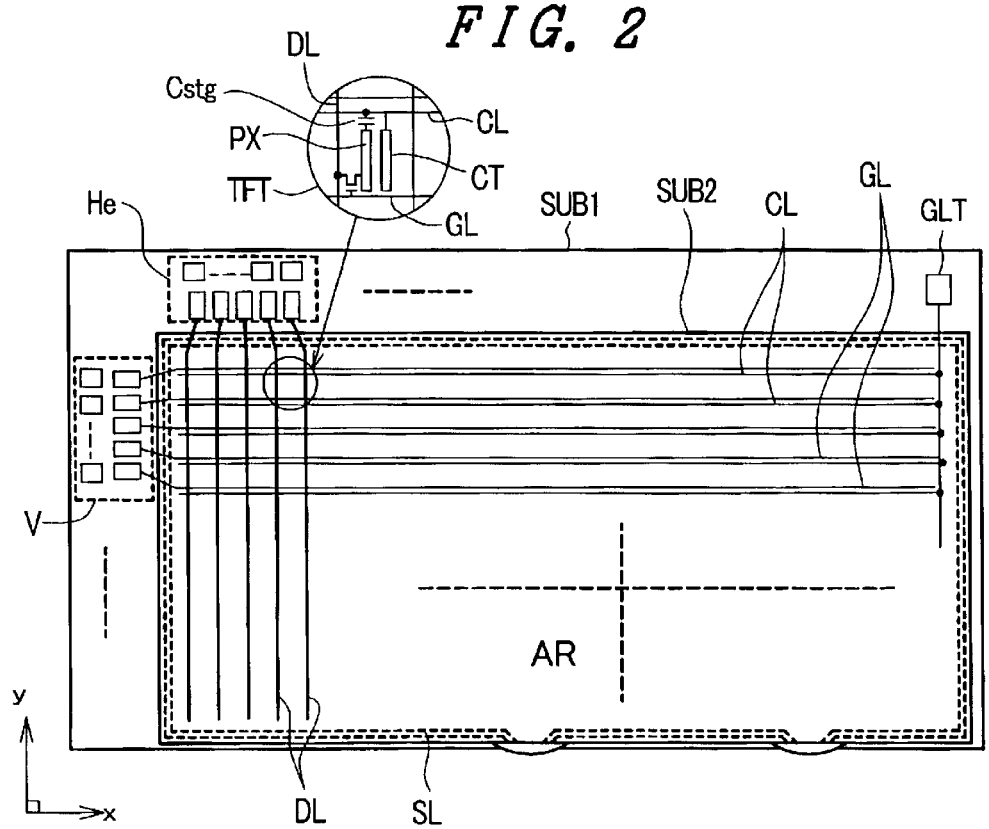
FIG. 2 is an equivalent circuit showing one embodiment of the liquid crystal display device in accordance with the present invention.

FIG. 2 is an equivalent circuit diagram showing one embodiment of the liquid crystal display device in accordance with the present invention. Although FIG. 2 is an equivalent circuit diagram, it illustrates circuitry in a way corresponding to the actual geometrical layout thereof.

Firstly, there are a pair of transparent substrates SUB1, SUB2 which are disposed to oppose each other with a layer of liquid crystal material interposed therebetween, wherein the liquid crystal material is sealed by a sealing material SL which also functions to fix the other transparent substrate SUB2 with respect to one transparent substrate SUB1.

Formed on a liquid crystal side surface of the one transparent substrate SUB1 which is surrounded by the seal material SL are gate signal lines GL that are parallel-provided in the "y" direction and extend in its "x" direction and drain signal lines DL parallel-provided in a "X" direction and extending in a "y" direction.

Regions which are surrounded by respective gate signal lines GL and respective drain signal lines DL constitute pixel regions, wherein a matrix-shaped ensemble of these respective pixel regions makes up a liquid crystal display section AR.

In addition, a common opposite or "counter" voltage signal line CL is formed in each of the respective pixel regions which are parallel provided in the x direction in such a way as to run within each pixel region. This counter voltage signal line CL is the one that becomes a signal line for supplying a to-be-later-described counter electrode CT in each pixel region with a voltage which becomes a reference relative to an image signal(s).

In each pixel region, there are formed a thin-film transistor TFT which is rendered operative by a scan signal coming from a gate signal line GL on one side thereof and a pixel electrode PX to which an image signal is supplied from the one-side drain signal line DL through this thin-film transistor TFT.

This pixel electrode PX is designed to cause an electric field to generate between it and a counter electrode CT which is formed integrally with the counter voltage signal line CL to thereby control the optical transmissivity of liquid crystals by this electric field.

Respective terminate ends of the gate signal line GL are extended to go beyond the seal material SL, and its extended ends are designed to make up terminals to which output terminals of a vertical scan drive circuit V are connected. Additionally, input terminals of the vertical scan drive circuit V are such that signals are input thereto from a printed wiring board which is disposed outside of a liquid crystal display panel.

The vertical scan drive circuit V consists essentially of a plurality of semiconductor devices, wherein a plurality of mutually neighboring gate signal lines are grouped with a single semiconductor device being operatively associated on a per-group basis.

Similarly, respective terminate ends of the above-stated drain signal line DL are extended to exceed the seal material SL, and its extended ends are designed to make up terminals to which output terminals of an image/video signal drive circuit He are connected. Additionally, input terminals of the image signal drive circuit He are such that signals are input thereto from the printed wiring board which is disposed outside of the liquid crystal display panel.

This image signal drive circuit He also consists essentially of a plurality of semiconductor devices, wherein a plurality of mutually neighboring drain signal lines are grouped with a single semiconductor device operatively associated on a per-group basis.

The counter voltage signal lines CL for common use with respective pixel regions parallel-provided in the x direction are commonly connected together at a terminate end portion on the right side in FIG. 2, wherein its connection line is extended to exceed the seal material SL and then constitutes a terminal CLT at the extended end thereof. A voltage which becomes a reference with respect to image signals is to be supplied from this terminal CLT.

The respective gate signal lines GL are arranged so that one of them is sequentially selected by a scan signal from the vertical scan drive circuit V.

In addition, an image signal is supplied by the image signal drive circuit He to each of the respective drain signal lines DL in a way synchronized with selection timings of the gate signal lines GL.

<<Pixel Arrangement>>

Figure 1:
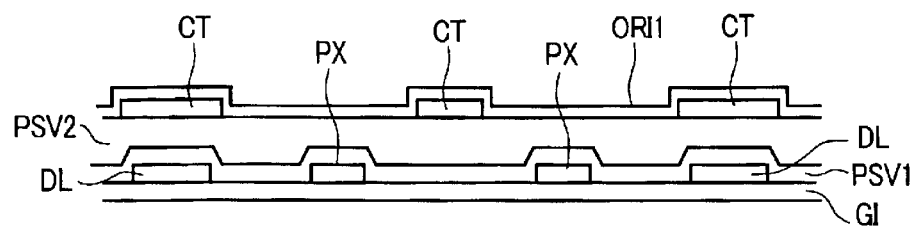
FIG. 1 is a main part construction diagram showing one preferred embodiment of the liquid crystal display device in accordance with the present invention, which is a cross-sectional diagram as taken along line I—I of FIG. 3.
Figure 3:
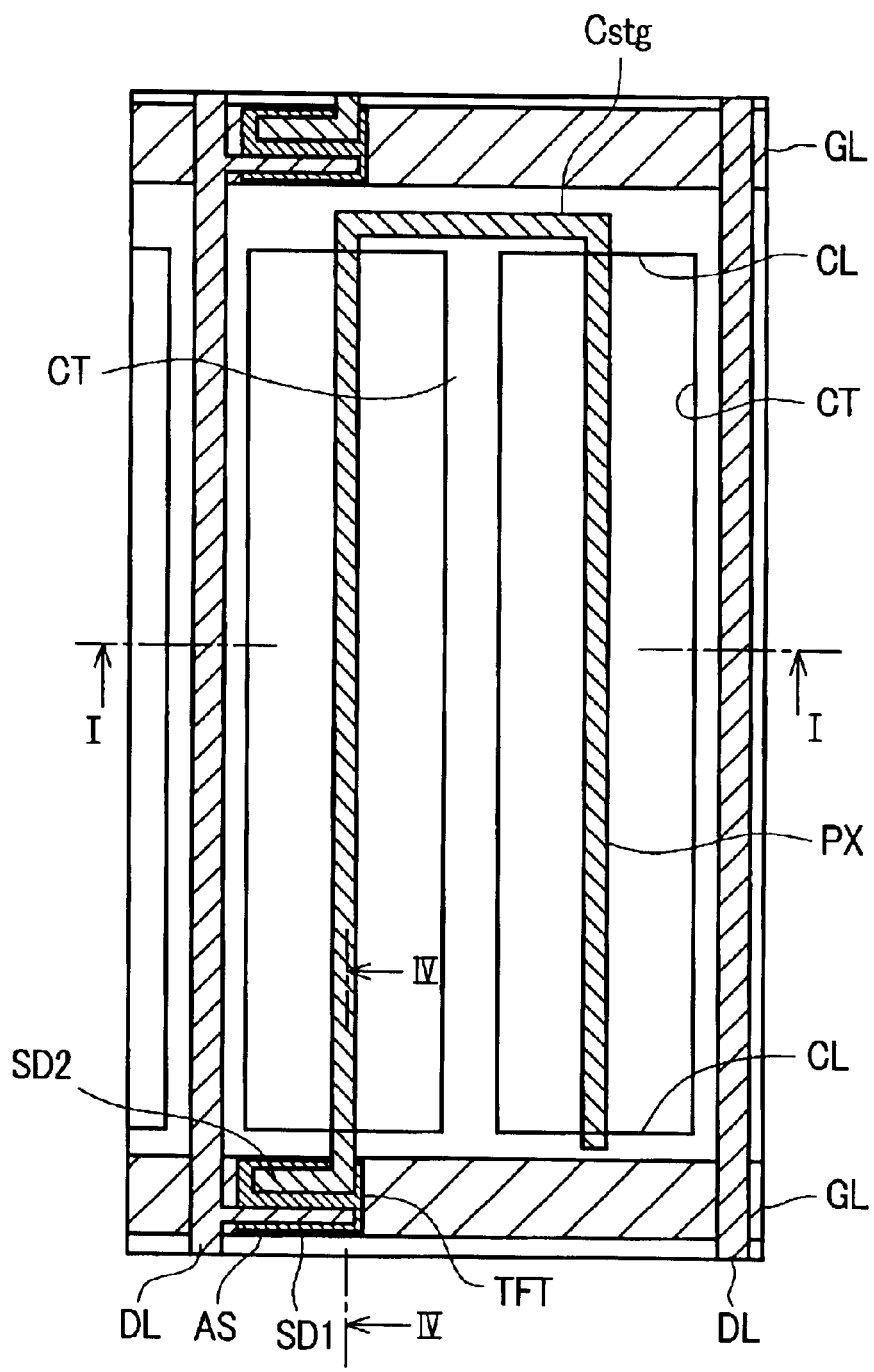
FIG. 3 is a plan view diagram showing one embodiment of a pixel of the liquid crystal display device in accordance with the present invention.
Figure 4:
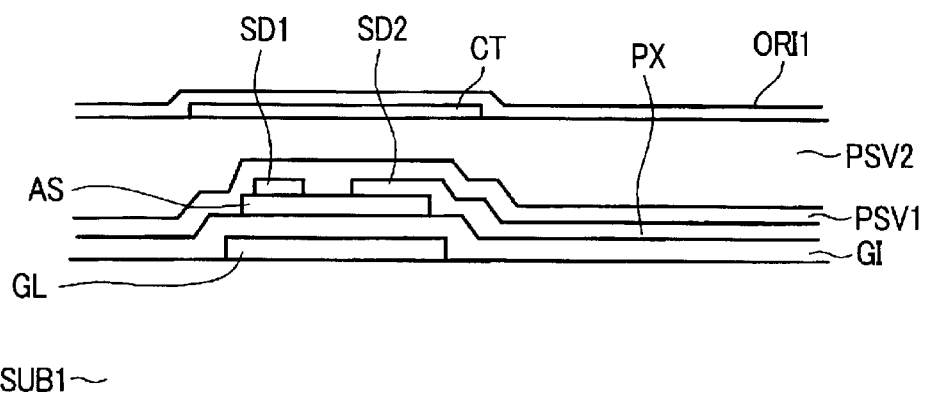
FIG. 4 is a sectional diagram along line IV—IV of FIG. 3.

FIG. 3 is a plan view diagram showing one embodiment of the above-noted pixel region. In addition, FIG. 1 shows a cross-sectional view as taken along line I—I of FIG. 3; FIG. 4 shows a sectional view along line IV—IV of FIG. 3.

Firstly, a pair of gate signal lines GL which extend in the x direction and are parallel-provided in the y direction are formed on the liquid crystal side surface of the transparent substrate SUB1.

These gate signal lines GL are designed to surround a rectangular region together with a pair of drain signal lines DL to be later described, wherein this region is for use as a pixel region.

A dielectric film GI made for example of SiN (see FIGS. 1 and 4) is formed on a surface of the transparent substrate SUB1 with the gate signal lines GL formed thereon in the way stated above in such a manner as to cover or coat the gate signal lines GL also.

This dielectric film GI functions as an interlayer dielectric film with respect to the gate signal lines GL in a formation region of drain signal lines DL to be later described and functions, in a to-be-later-described thin-film transistor TFT formation region, as a gate insulation film thereof.

And, a semiconductor layer AS made for example of amorphous Si is formed on a surface of this dielectric film GI in such a way as to overlap portions of the gate signal lines GL.

This semiconductor layer AS is that of a thin-film transistor TFT; thus, it is possible by forming above its upper surface a drain electrode SD1 and source electrode SD2 to make up a MIS transistor of an inverse stagger structure with part of a gate signal line as its gate electrode.

Here, the drain electrode SD1 and source electrode SD2 are to be formed simultaneously during formation of the drain signal lines DL.

More specifically, the drain signal lines DL which extend in the y direction and are parallel-provided in the x direction are formed; part thereof is extended up to the upper surface of the semiconductor layer AS to thereby form the drain electrode SD1; and, the source electrode SD2 is formed so that it is spaced apart from this drain electrode SD1 by a distance corresponding to the channel length of the thin-film transistor TFT.

Additionally this source electrode SD2 is formed integrally with a pixel electrode PX which is to be formed within the pixel region.

More specifically, the pixel electrode PX is constituted from a group of multiple electrodes (two in FIG. 3) which extend within the pixel region in its y direction and are parallel-provided in the x direction thereof. One terminate end portion of one pixel electrode PX of them is also for use as the source electrode SD2; and, at the other end portion, mutual electrical connection is established at a portion corresponding to the other pixel electrode PX.

It should be noted that although not specifically depicted herein, a thin layer that is heavily doped with a chosen type of impurities is formed at an interface between the semiconductor layer AS and the drain electrode SD1 and source electrode SD2, wherein this layer is designed to function as a contact layer.

This contact layer may be formed by a method having the steps of providing the heavily doped impurity layer which has already been formed on or above a surface of the contact layer during fabrication of the semiconductor layer AS by way of example, using as a mask a pattern of the drain electrode SD1 and source electrode SD2 which are formed on its upper surface, and then etching away a portion of the impurity layer which is exposed therefrom.

A protective film PSV (see FIGS. 1 and 4) is formed over the surface of the transparent substrate SUB1 with the thin-film transistor TFT and the drain signal lines DL along with the drain electrode SD1 and the source electrode SD2 plus the pixel electrode PX formed thereon in this way. This protective film PSV is a film that avoids direct contact between the thin-film transistor TFT and the liquid crystals to thereby prevent degradation of the characteristics of the thin-film transistor TFT.

Note here that this protective film PSV is made up of a multilayer structure which consists of a sequential lamination of a protective film PSV1 formed for example of an inorganic material layer such as SiN and a protective film PSV2 formed of an organic material layer such as resin or the like. The use of at least the organic material layer as the protective film PSV in this way is aimed at reduction of the dielectric constant of the protective film per se.

Also note that this protective film PSV should not be limited only to the above-stated multilayer structure and may alternatively be constituted from only the organic material layer such as resin or the like.

A counter electrode CT is formed at the upper surface of the protective film PSV. This counter electrode CT is made up of a group of multiple electrodes (three in the drawing) which extend in the y direction and are parallel-provided in the x direction in a similar manner to that of the above-described pixel electrode PX, wherein each of these electrodes is placed between the pixel electrodes PX when seeing planarly.

More specifically, respective ones of the counter electrodes CT and the pixel electrodes PX are disposed at intervals of equal distance in the order of sequence of a counter electrode, pixel electrode, counter electrode, pixel electrode, . . . , and counter electrode at part spanning from a drain signal line on one side to a drain signal line on the other side.

Here, the counter electrodes CT that are placed on the both sides of the pixel region are such that a portion thereof is formed to overlap the drain signal line DL and also is formed in common to a corresponding counter electrode CT of its neighboring pixel region.

In other words, the counter electrode CT overlaps the drain signal line DL with their center axes being substantially made identical to each other, wherein the counter electrode CT has its width which is formed to be greater than that of the drain signal line DL. The counter electrode CT on the left side relative to the drain signal line DL constitutes one of respective counter electrodes CT of the left side pixel region whereas the counter electrode CT on the right side constitutes one of respective counter electrodes CT of the right side pixel region.

In this way, forming over the drain signal line DL the counter electrode CT which is greater in width than this drain signal line DL makes it possible to offer an effect which follows: it is possible to avoid unwanted termination of electric flux lines from the drain signal line DL at the counter electrode CT, which leads to termination at the pixel electrode PX. Because when the electric flux lines from the drain signal line DL terminate at the pixel electrode PX, this results in occurrence of noises.

Each counter electrode CT consisting of an electrode group is formed integrally with the counter voltage signal line CL which is made of the same material as that formed to sufficiently cover the gate signal line GL, to which a reference voltage is to be supplied through this counter voltage signal line CL.

The counter voltage signal line CL which is formed to sufficiently cover the gate signal line GL is such that a connection portion of the above-stated each pixel electrode PX is placed at its under layer at a portion that is overextended from such gate signal line GL whereby a capacitive element Cstg with the protective film PSV as its dielectric film is formed between the pixel electrode PX and the counter voltage signal line CL.

This capacitive element Cstg is designed for example to have a function of relatively long storing an image signal as has been supplied to the pixel electrode PX.

And, an orientation film ORI1 (see FIGS. 1 and 4) is formed on the upper surface of the transparent substrate SUB1 with the counter electrodes CT formed thereon in such a way as to cover the counter electrodes CT also. This orientation film ORI1 is a film in direct contact with the liquid crystals and is designed so that rubbing formed on its surface determines the initial orientation or alignment directions of liquid crystal molecules.

A silane coupling material is mixed into this orientation film ORI1; and, this silane coupling material is mixed at a ratio ranging from 0.1 to 2% with respect to a solid component concentration of the orientation film.

In view of the fact that the orientation film ORI1 with the silane coupling material mixed thereinto in this way is strengthened in adhesion force between itself and the counter electrode CT and also is relatively large in area for formation of the counter electrode CT per pixel, it becomes possible to preclude unwanted separation or peel-off of the orientation film ORI1, which in turn makes it possible to prevent occurrence of the phenomenon in the mode 1 described previously.

The mode 1 phenomenon is such that when it is in the initial state, the orientation effect is not zero due to the rubbing being applied to the orientation film ORI1—for this reason, in the case of what is called the normally black mode in which black display is done when no electric fields are created between the pixel electrode PX and the counter electrode CT, such black display is properly observed. However, as power feed is continued, the alignment in regions with the absence of this orientation film ORI1 will gradually be destroyed upon influence of the movement of liquid crystal molecules.

Here, the reason why the silane coupling material to be mixed is specifically set at a ratio ranging from 0.1 to 2% is that if it is less than 0.1% then the resulting adhesive force with respect to the counter electrode CT becomes deficient and, on the contrary, if it is greater than 2% then afterimages can occur to an extent that these are readily recognizable by human eyes.

It should be noted that this embodiment may also be applied to other respective embodiments to be later explained in the description.

Embodiment 2

The orientation film ORI1 shown in Embodiment 1 is the one in which the silane coupling material is mixed into its material. However, without requiring the use of such additive, similar effects have been obtained by reducing its baking temperature than 250° C. or less during baking or firing of the orientation film ORI1.

It is considered that traditionally, the baking temperature during formation of the orientation film ORI1 is set at 250° C. or higher, resulting in its heat being accumulated at the counter electrode CT thereby causing the orientation film ORI1's adhesion force relative to the counter electrode CT to decrease in strength.

It has been found that due to this, during rubbing processing of the orientation film ORI1, only the orientation film ORI1 overlying the counter electrode CT peels off, resulting in occurrence of the mode 1 phenomenon stated supra.

By taking this into consideration, the baking temperature during formation of the orientation film ORI1 is set at 250° C. or below to thereby avoid degradation of the adhesive force of the orientation film ORI1 with respect to the counter electrode CT.

Note that this embodiment may be applied not only to the above-stated embodiment but also to other respective embodiments as will be later explained in the description.

Embodiment 3

Figure 5:
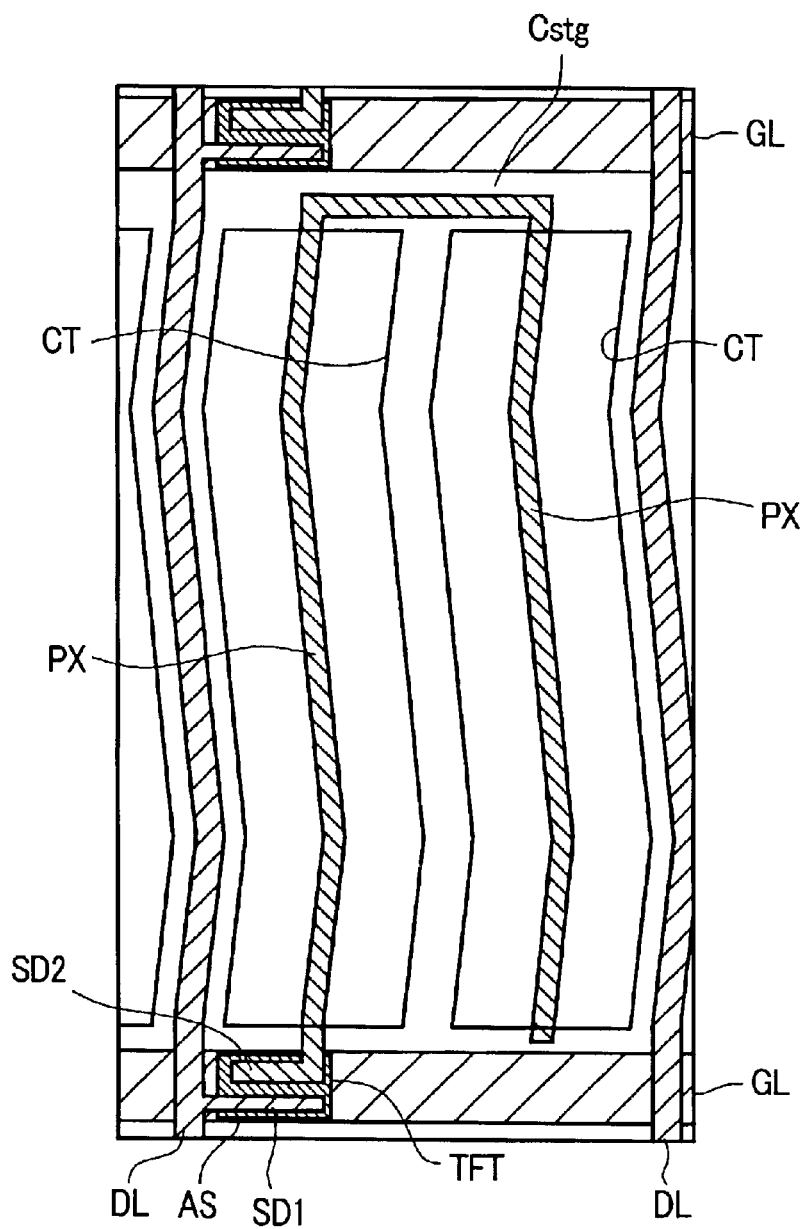
FIG. 5 is a plan view diagram showing another embodiment of the pixel of the liquid crystal display device in accordance with the present invention.

FIG. 5 is a plan view diagram showing another embodiment of the liquid crystal display device in accordance with the present invention, which is a diagram corresponding to FIG. 3.

A different arrangement when compared to the case of FIG. 1 lies in the pattern of counter electrodes CT and the pattern of pixel electrodes PX which is modified in a way corresponding to the pattern of counter electrodes CT.

Each counter electrode CT is formed to have a zigzag shape having a plurality of bent portions in its extending direction; each pixel electrode PX also is formed into a zigzag shape in such a manner as to become in parallel with the counter electrode CT which is disposed adjacent thereto.

The liquid crystal display device thus arranged in this way is such that in its orientation film ORI1 which is formed above the counter electrode CT to cover this counter electrode CT also, even when peel-off takes place only at the orientation film ORI1 overlying the counter electrode CT, such peel-off is limited so that it does not exceed the location of a bent portion; thus, it is possible to suppress expansion of damages.

It must be noted that although FIG. 5 is the one that causes the drain signal line DL also to have a zigzag shape in harmonization with the pattern of the pixel electrode PX, it is obvious that it is modified to have a straight line shape.

Also note that it is obvious that this embodiment may be applied not only to the above-stated each embodiment but also to other respective embodiments as will be later explained in the description.

Embodiment 4

In this embodiment, its feature lies in that the film thickness of the orientation film ORI1 is set to range from 60 to 250 nm in each of the embodiments stated above.

It has been affirmed that the orientation film ORI1 thus formed is free from risks of peel-off on the counter electrode CT.

It has also been made sure that when the film thickness of the orientation film ORI1 is made less than 60 nm, peel-off occurs and also that the above-noted mode 3 phenomenon occurs when letting it be greater than 250 nm.

Additionally, it is obvious that this embodiment may be applied not only to each of the above-stated embodiments but also to other respective embodiments as will be later explained in the description.

Embodiment 5

In this embodiment, its feature lies in that the imidization ratio of the orientation film ORI1 is set at 95% or less.

The orientation film ORI thus arranged is such that when compared to the case of complete imidization, it is possible to form the orientation film per se while letting it have flexibility and plasticity; thus, it becomes to have durability against vibration shocks.

Due to this, it is possible to suppress occurrence of the above-stated mode 2 phenomenon. This mode 2 phenomenon is a phenomenon in which the orientation film ORI1 is peeled off from upper part of the protective film PSV which is an organic material layer and then disappears, wherein it does not generate in the initial state but generates mainly upon application of vibrations and shocks. Evaluation results of the inventors revealed that most bright points generated are in this mode.

To be brief, this mode becomes a phenomenon which features in that the orientation film ORI1 that has been presented in the initial state disappears after having applied vibrations and shocks thereto.

A greater detailed description of this inconvenience is as follows. While the formation of the above-noted protective film PSV and counter electrode CT plus orientation film ORI1 is done through the process steps of (1) material film fabrication of the protective film PSV, (2) material film fabrication of the counter electrode CT, (3) etching micromachining for patterning of the counter electrode CT, and (4) material film fabrication of the orientation film ORI1, there are risks that damages can occur at a surface of the protective film PSV at the step (2) and further damages occur at a surface of the protective film PSV at the step (3). And, at the step (4), a gas generates from the surface of protective film PSV due to heat in such event, resulting in continuous presence between it and the orientation film ORI1 without disappearing.

Due to this, vibrations and shocks occurring thereafter cause occurrence of peel-off of the orientation film ORI1 with respect to the protective film PSV, which becomes the cause of alignment defects.

Additionally, it is obvious that this embodiment may be applied not only to each of the above-discussed embodiments but also to other respective embodiments as will be explained later.

Embodiment 6

Figure 6:
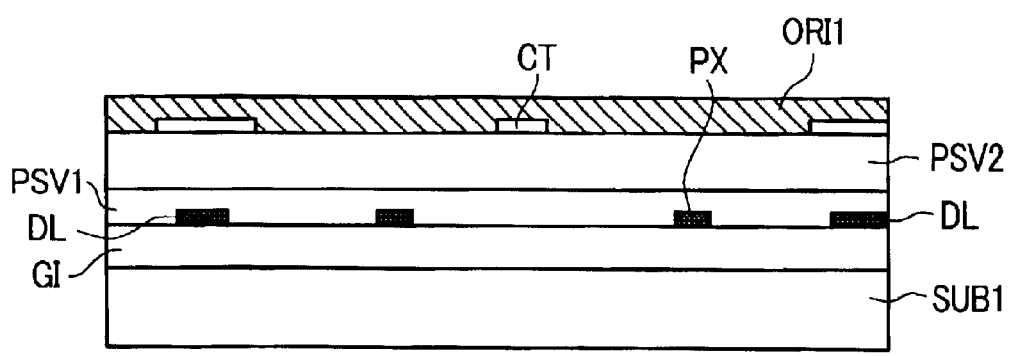
FIG. 6 is a sectional diagram showing another embodiment of the pixel of the liquid crystal display device in accordance with the present invention.

FIG. 6 is a cross-sectional diagram showing another embodiment of the liquid crystal display device in accordance with the present invention, which is a diagram corresponding to FIG. 1.

As shown in FIG. 6, the orientation film ORI1 which is formed on the protective film PSV to also cover the counter electrode CT has a difference between its film thickness over the protective film PSV and its film thickness over the counter electrode CT and is designed so that its film thickness over the protective film PSV is greater than its film thickness over the counter electrode CT.

This orientation film ORI1 may be designed to have the above-stated arrangement by forming one in which an NV value indicative of the solid component concentration in its orientation film liquid solution is less than or equal to 8%.

Additionally, it is required that the NV value be set at 2% or more because if it is too less then the film thickness of the orientation film ORI1 over the counter electrode CT becomes too small resulting in the mode 1 phenomenon tending to readily occur. For practical use, it is desirable to set at a value which falls within a range of 4 to 6% in view of a balance between the orientation film ORI1's film thickness over the counter electrode CT and its thickness over the protective film PSV.

With the use of such an arrangement, it is possible to enlarge the film thickness of the orientation film ORI1 on a surface of the protective film PSV which is exposed from the counter electrode CT, which in turn makes it possible to eliminate or minimize the peelability from this protective film PSV; thus, it is possible to suppress occurrence of the mode 2 phenomenon stated previously.

Needless to say, this embodiment may be applied to each of the above embodiments and also to other respective embodiments as will be later explained in the description.

Embodiment 7

In this embodiment, this is the one in which an attempt is made to set the film thickness of the orientation film ORI1 to less than or equal to 250 nm to thereby prevent the orientation film ORI1 above the counter electrode CT from floating up from the counter electrode CT.

This is aimed at suppression of generation of the mode 3 phenomenon after having confirmed that in cases where the film thickness of the orientation film ORI1 becomes greater than 250 nm, the orientation film ORI1's film stress becomes larger accordingly resulting in the orientation film ORI1 behaving to float up from the counter electrode CT.

Studying the generation cause of the mode 3 phenomenon revealed that a difference in thermal conductivity between the protective film PSV and the counter electrode CT results in occurrence of differences in shrinkage and expansion of the orientation film ORI1 due to a difference in thermal capacity between portions over the protective film PSV and the counter electrode CT within the same pixel region at the stage of baking the orientation film ORI1 and in its following thermal hysteresis process to thereby absorb the film stress of the orientation film ORI so that float-up of the orientation film ORI1 takes place over the counter electrode CT which is less in adhesive force.

As the orientation film ORI1 which once floated up has been oriented, normal display is achieved in the initial state; however, a change in ambient temperature—for example, letting it alternately change between temperatures of −20° C. and 50° C. once at a time whenever a prespecified length of time has elapsed (temperature cycling test)—would result in bright point display becoming recognizable gradually. It has been found that this occurs because repeated experience of expansion and shrink of a portion at which the orientation film ORI1 becomes free due to float-up by the temperature cycle results in the orientation state of the orientation film ORI1 at its float-up portion(s) behaving to tumble down.

It is obvious that this embodiment may be applied to each of the aforesaid embodiments and also to other respective embodiments as will be later explained in the description.

Embodiment 8

This embodiment is the one that is arranged to let the orientation film ORI1 be different in film thickness in a plurality of respective subdivided regions within a single pixel region.

With such an arrangement, the film stress occurring in the orientation film ORI1 is absorbed by film thickness-change portions; thus, it is possible to prevent the orientation film ORI1 above the counter electrode CT from floating up from the counter electrode CT, which in turn makes it possible to suppress occurrence of the above-noted mode 3 phenomenon.

Obviously this embodiment may be applied to each of the aforementioned embodiments and also to other respective embodiments as will be later explained in the description.

Embodiment 9

Figure 7:
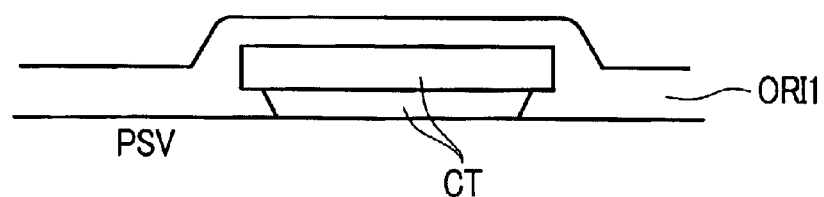
FIG. 7 is a main-part sectional diagram showing another embodiment of the pixel of the liquid crystal display device in accordance with the present invention.

FIG. 7 is a diagram showing a cross-section of the counter electrode CT stated above. Sidewall surfaces of the counter electrode CT are such that a taper like an inverted trapezoid, so called the inverse taper, is formed from the bottom surface to upper surface of the counter electrode CT.

The orientation film ORI1 which is formed on the protective film PSV to cover the counter electrode CT also is such that its material invades the inverse-tapered sidewall surfaces of the counter electrode CT also and thus comes to have fixation effects with respect to the force acting in an upward direction of the drawing.

Thus it becomes possible to prevent the orientation film ORI1 which overlies the counter electrode CT from floating up from the counter electrode CT, thereby enabling suppression of occurrence of the mode 3 phenomenon.

It is to be noted that although in FIG. 7 the counter electrode CT is formed to have a two-layer structure with its lower material layer having a taper such as the one discussed above, it should not be limited only to this and, needless to say, may be modified so that the counter electrode CT is structured from the lower material layer alone.

Obviously this embodiment may be applied to each of the aforementioned embodiments and also to other respective embodiments as will be later explained in the description.

Embodiment 10

Figure 8:
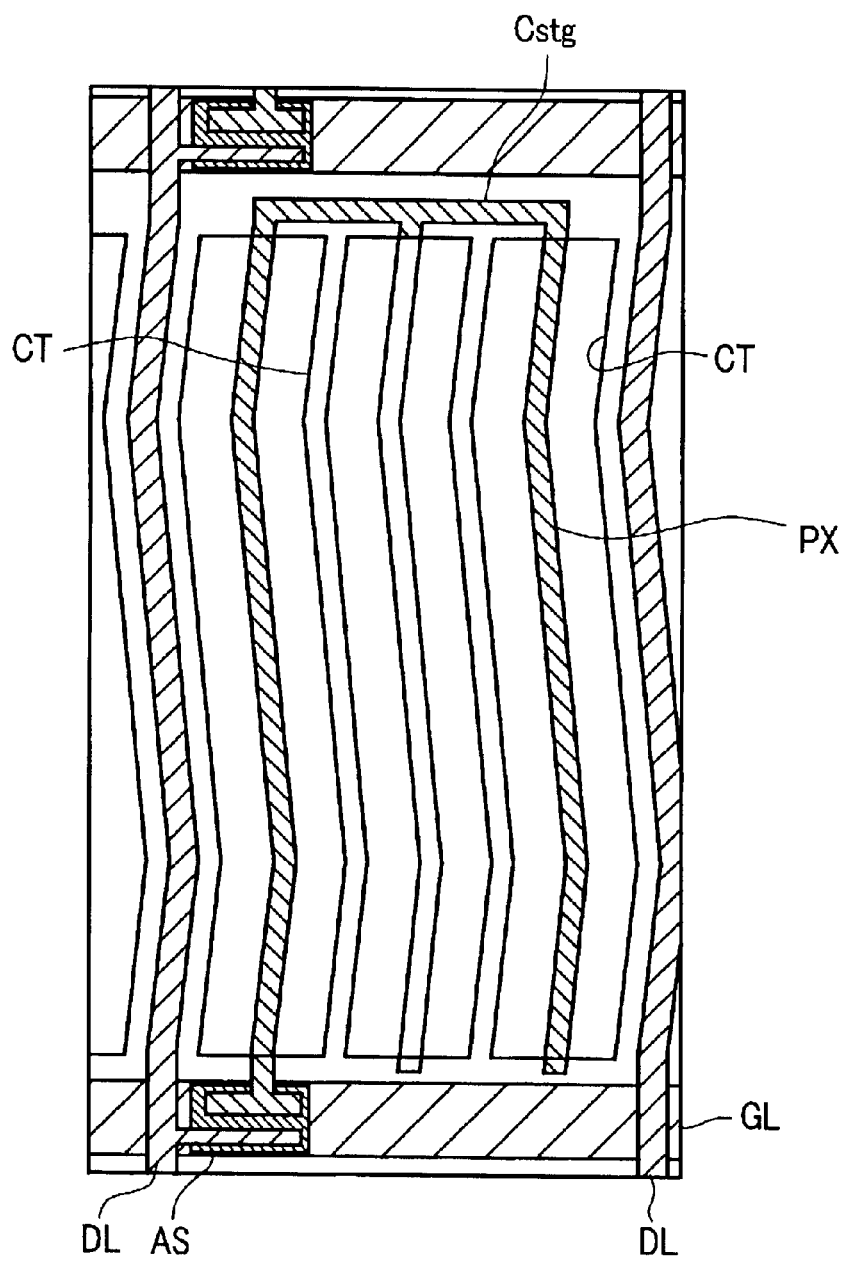
FIG. 8 is a plan view diagram showing another embodiment of the pixel of the liquid crystal display device in accordance with the present invention.
Figure 9:
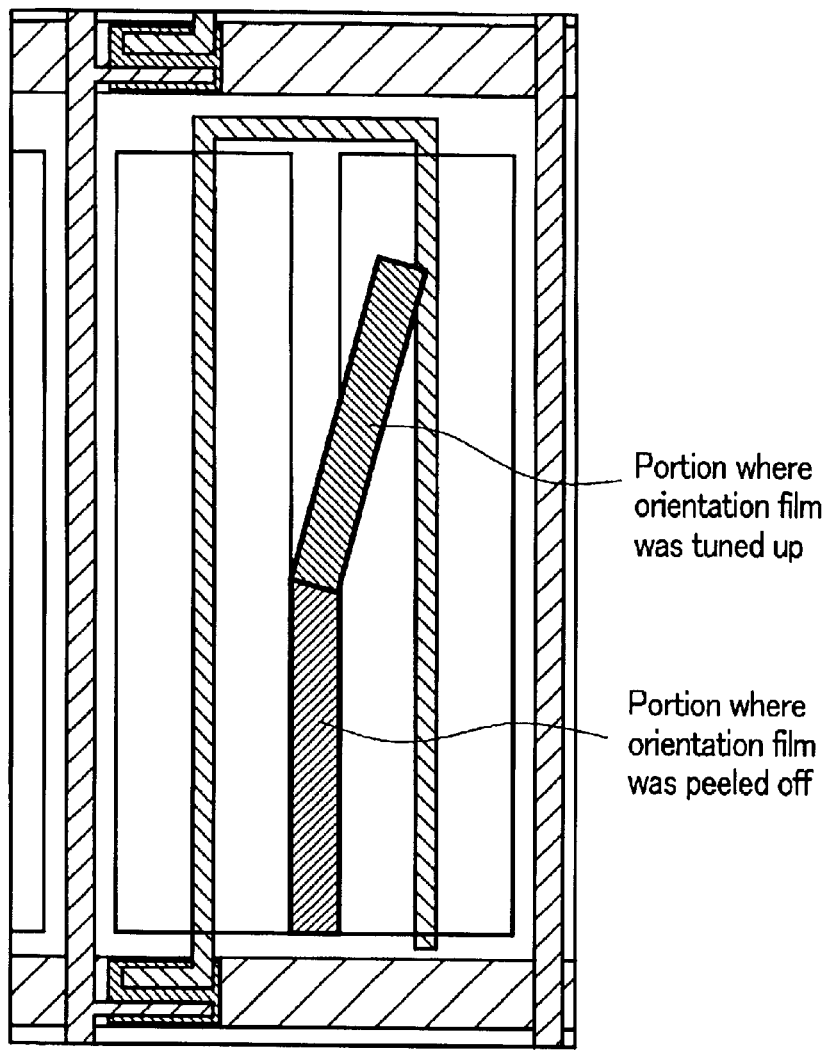
FIG. 9 is a explanation diagram showing a phenomenon (mode 1) of the prior art showing a problem of the present invention.
Figure 10:
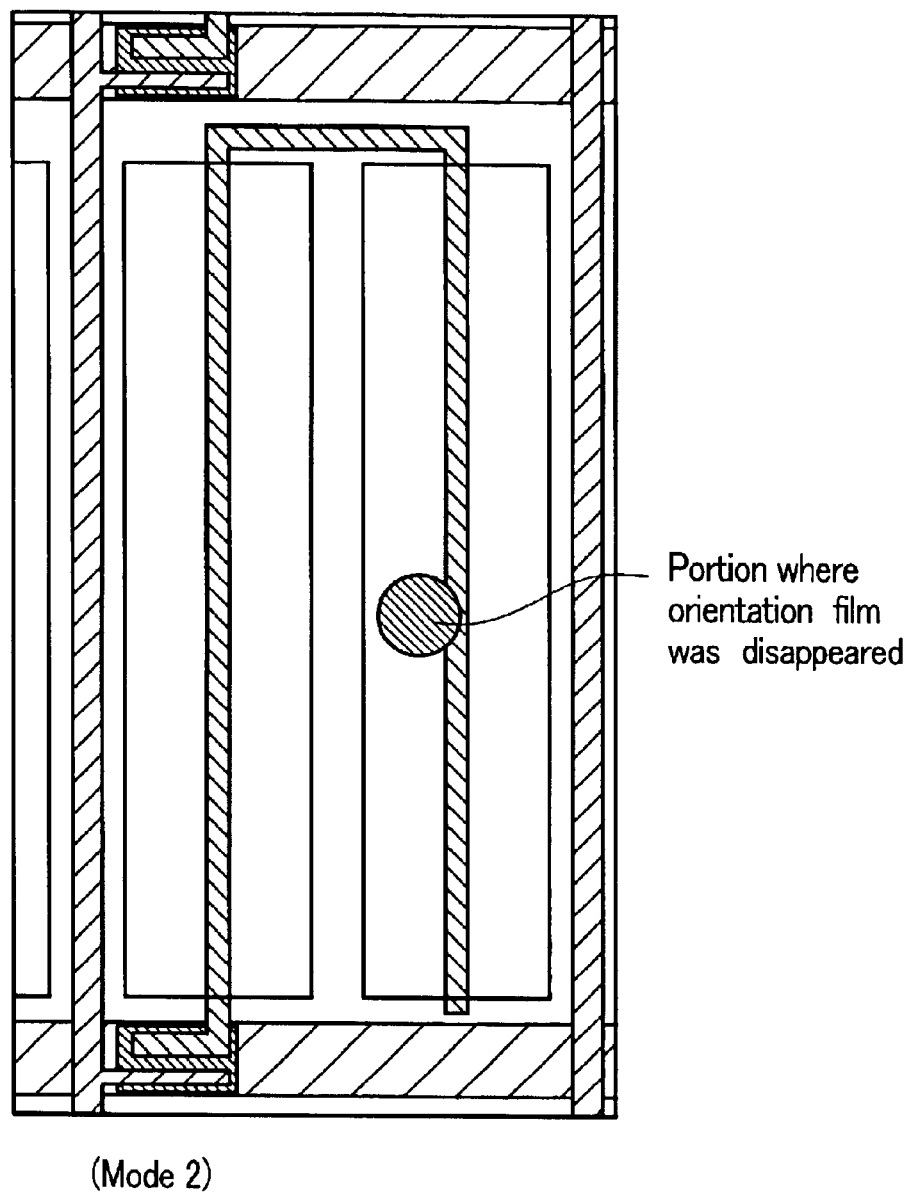
FIG. 10 is an explanation diagram showing a prior art phenomenon (mode 2) showing a problem of the present invention.
Figure 11A:
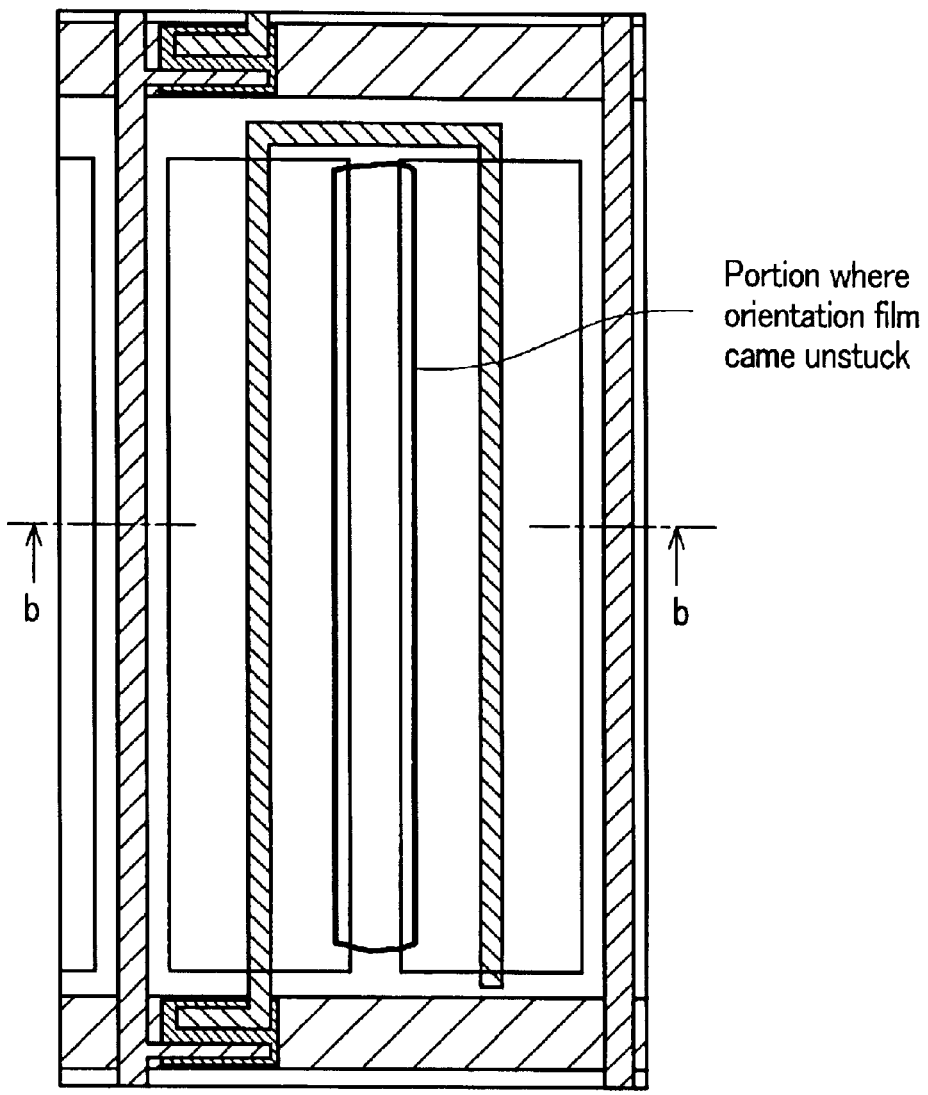
FIG. 11 is an explanation diagram showing a prior art phenomenon (mode 3) showing a problem of the present invention.
Figure 11B:
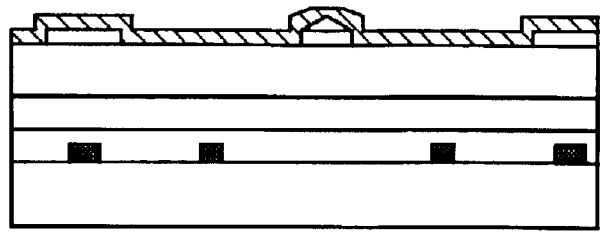

FIG. 8 is a plan view diagram showing another embodiment of the liquid crystal display device in accordance with the present invention, which is a diagram corresponding to FIG. 3.

A difference in arrangement from the case of FIG. 3 lies in that respective divided regions occupied by the counter electrode CT per pixel region consist of four regions whereas respective divided regions that the exposed portion of the protective film PSV occupies are three regions.

The liquid crystal display device thus arranged in this way is such that the width of each of the exposed portion of the protective film PSV which extends to have a band or strap-like shape and the counter electrode CT becomes narrower; thus, even upon creation of deformation or distortion relative to the orientation film ORI1 that is formed on the protective film PSV to cover the counter electrode CT also, it is possible to suppress accumulation of such distortion and thus prevent the orientation film ORI1 overlying the counter electrode CT from floating up from the counter electrode CT, thereby enabling suppression of generation of the mode 3 phenomenon.

From this, it is possible to expect further effects by letting respective divided region occupied by the counter electrode CT be four regions or more while letting respective divided regions occupied by the exposed portion of the protective film PSV consist of three regions or more.

According to experimentation, it has been found that it is effective that the ratio of the exposed portion of the protective film PSV to the counter electrode CT within a single pixel region falls within a range of 0.5 to 5.

Obviously this embodiment is also applicable to each of the embodiments stated above.

In each of the above-stated embodiments, there have been shown the ones with the counter electrode CT formed at the upper surface of the protective film PSV. However, it would readily occur to the person skilled in the art that the same is applicable without requiring no specific changes to an arrangement in the case of positioning this counter electrode CT at an under layer of the protective film PSV while forming the pixel electrode PX at an upper surface of the protective film PSV.

Embodiment 11

Figure 12:
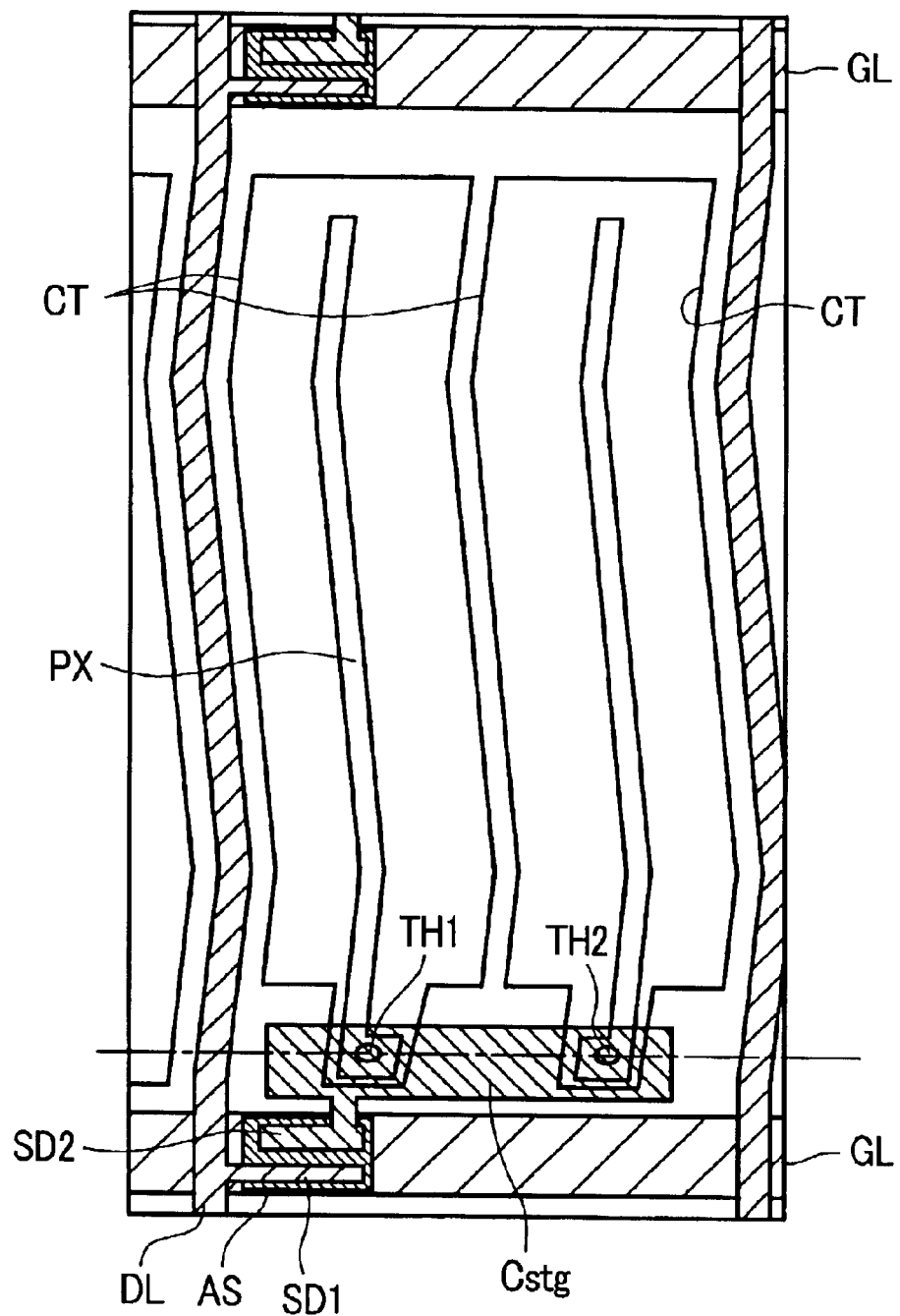
FIG. 12 is a plan view diagram showing another embodiment of the pixel of the liquid crystal display device in accordance with the present invention.
Figure 13:
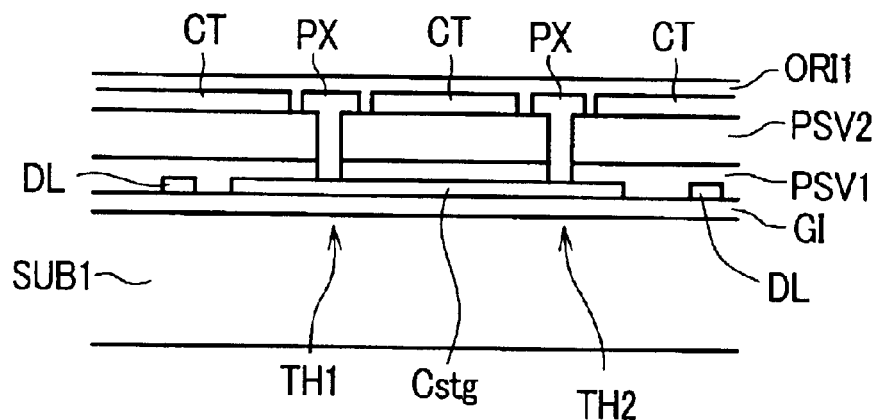
FIG. 13 is a sectional diagram showing another embodiment of the pixel of the liquid crystal display device in accordance with the present invention.

FIG. 12 is a plan view diagram showing another embodiment of the present invention as disclosed herein, which is a diagram corresponding to FIG. 3. FIG. 13 is a cross-sectional diagram of a broken-line part of FIG. 12.

With this embodiment, the counter electrode CT and the pixel electrode PX are in direct contact with the orientation film ORI1. Whereby the number of exposed regions of the orientation film is increased resulting in an increase in adhesive force of the orientation film ORI1.

In addition, with the structure of FIG. 12, an SD2 electrode of TFT is connected to its adjacent Cstg. And over this Cstg, the pixel electrode PX is connected by through-holes TH1 and TH2 which are provided in PSV2 and PSV1. In this way, let the pixel electrode PX and the counter electrode CT be the same layer.

CT and Cstg between neighboring PXs have an overlap portion(s) whereby a holding capacitance Cstg is formed. Additionally, in order to reduce leakage electric fields from Cstg, Cstg other than through-hole nearby portions is covered with the counter electrode CT. The counter electrode CT at the through-hole nearby portions is disposed so that a region between Cstg and GL is not exposed from the counter electrode CT.

This structure is combinable with each of the embodiments stated supra.

Embodiment 12

Figure 14:
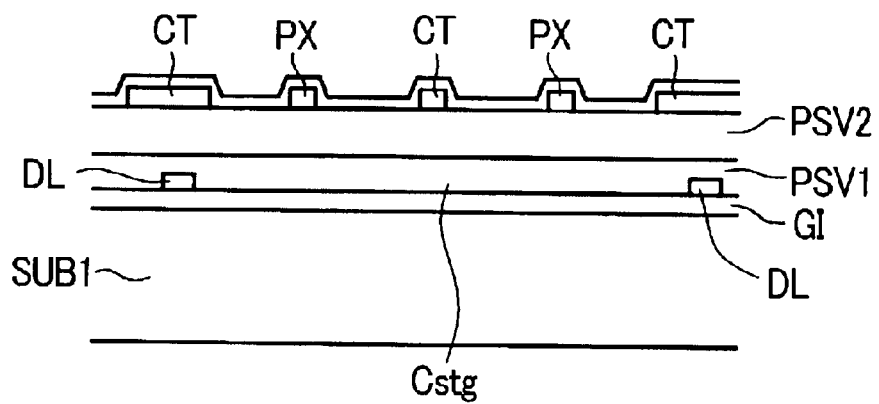
FIG. 14 is a sectional diagram showing another embodiment of the pixel of the liquid crystal display device in accordance with the present invention.

FIG. 14 is a cross-sectional diagram showing another embodiment of the invention as disclosed herein, which is a sectional structure of a pixel portion.

A principal feature of this embodiment lies in that it has a plurality of regions which are different in film thickness of the orientation film ORI1 between electrodes. Whereby, let it be a structure which causes the adhesive force of the orientation film ORI1 and PSV2 to disperse and thus hardly peels off.

Additionally as shown in FIG. 14, it is possible to further enhance the ability to prevent peel-off by providing in the pixel a plurality of regions which are different in distance between the electrodes and by letting a film thickness of the orientation film ORI1 in a region which is narrow in distance between the electrodes be greater than a film thickness of the orientation film ORI1 in a region that is wide in distance between the electrodes. In FIG. 14, a film thickness of the orientation film ORI1 between pixel electrodes PX adjacent to a central counter electrode CT is made greater than a film thickness of orientation film ORI1 between a counter electrode CT overlying DL and its neighboring pixel electrode PX.

Although this structure is realizable by various methods, it can be realized, for example, by using a fluidity-increased orientation film solution as a result of setting the solid component concentration in an orientation film liquid at 2% or less to force part of the orientation film solution as painted on the counter electrode CT or the pixel electrode PX which is a height-increased region to move and flow toward a portion between the electrodes, and thereafter applying baking or firing to the orientation film.

This structure is combinable with each of the above-stated embodiments.

As apparent from the foregoing explanation, according to the liquid crystal display device incorporating the principles of the present invention, it is possible to permit equipment of a reliable orientation film(s).

What is claimed is:

1. A liquid crystal display device comprising: a pair of substrates with a liquid crystal layer therebetween; a pair of electrodes disposed adjacent to each other in each pixel region of a liquid crystal side surface of one of the pair of substrates; at least one of the pair of electrodes being formed on a protective film comprised of an organic film, wherein said at least one of said pair of electrodes is in contact with an orientation film, and has a taper shape with a width contacting said protective film being narrower than a width contacting said orientation film.

2. A liquid crystal display device according to claim 1, wherein each of said pair of electrodes has a comb-tooth or zigzag shaped pattern as bent along an identical extending direction facing each other such that one of said pair of electrodes is substantially in parallel to the other of said pair of electrodes.

3. A liquid crystal display device according to claim 1, wherein the film thickness of said orientation film ranges from 60 to 250 nm.

4. A liquid crystal display device according to claim 1, wherein regions with said protective film being exposed from said pair of electrodes in each pixel are three or more.

5. A liquid crystal display device according to claim 1, wherein both of said pair of electrodes are in contact with said orientation film.

6. A liquid crystal display device according to claim 1, wherein the orientation film is thicker in a region narrow in distance between said pair of electrodes than in a region wide in distance between said pair of electrodes.

7. The liquid crystal display device according to claim 1, wherein each of said at least one of said pair of electrodes in contact with said orientation film has a multilayer structure.

8. A liquid crystal display device according to claim 7, wherein a width of a lower layer of the electrode of said multilayer structure is narrower than a width of an upper layer thereof.

9. A liquid crystal display device according to claim 1, wherein a film thickness of the orientation film overlying the protective film is greater than a film thickness of the orientation film overlying said at least one of said pair of electrodes being formed on the protective film.

10. A liquid crystal display device according to claim 1, wherein a film thickness of the orientation film between said pair of pixel electrodes not overlaying a drain signal line is greater than a film thickness of orientation film between said pair of pixel electrodes overlaying a drain signal line.

* * * * *